Sept. 26, 1961 G. R. GIUSTI ET AL 3,001,334
TIRE SIDEWALL-ABRADING APPARATUS
Filed March 9, 1959 9 Sheets-Sheet 1

Fig. 1

INVENTORS
GEORGE R. GIUSTI
ELWOOD A. STIEGLER
BY ALF C. HIRSCH
Charles A. Blank
ATTORNEY.

Fig. 4

Sept. 26, 1961 G. R. GIUSTI ET AL 3,001,334
TIRE SIDEWALL-ABRADING APPARATUS
Filed March 9, 1959 9 Sheets-Sheet 5

Fig. 5

INVENTORS
GEORGE R. GIUSTI
BY ELWOOD A. STIEGLER
ALF C. HIRSCH

Charles A. Blank
ATTORNEY.

Sept. 26, 1961 G. R. GIUSTI ET AL 3,001,334
TIRE SIDEWALL-ABRADING APPARATUS
Filed March 9, 1959 9 Sheets-Sheet 8

INVENTORS
GEORGE R. GIUSTI
BY ELWOOD A. STIEGLER
ALF C. HIRSCH

Charles A. Blank
ATTORNEY.

Fig. 13

United States Patent Office 3,001,334
Patented Sept. 26, 1961

3,001,334
TIRE SIDEWALL-ABRADING APPARATUS
George R. Giusti, Springfield, Mass., and Elwood A. Stiegler, Grosse Pointe Park, and Alf C. Hirsch, Grosse Pointe, Mich., assignors to United States Rubber Company, New York, N.Y., a corporation of New Jersey
Filed Mar. 9, 1959, Ser. No. 798,148
5 Claims. (Cl. 51—3)

This invention relates to apparatus for abrading the sidewalls of tires and, more particularly, to apparatus for grinding and cleaning white sidewalls.

Heretofore, apparatus for abrading the sidewalls of tires have, in general, been subject to several limitations. It has ordinarily been necessary for an operator manually to place each tire on the apparatus, then to position the grinding wheel of the apparatus and to remove the tire after abrasion. Moreover, a different manually selected position was required for the grinding wheel for tires of different sizes.

It is an object of the present invention, therefore, to provide a new and improved apparatus for precisely abrading the sidewalls of tires, which avoids one or more of the above-mentioned limitations of prior apparatus.

It is another object of the invention to provide a new and improved apparatus for precisely abrading the sidewalls of tires, which is effective to operate automatically.

It is another object of the invention to provide a new and improved apparatus for precisely abrading the sidewalls of tires in a wide range of sizes, which is effective automatically to position the tire properly for sidewall abrasion.

It is another object of the invention to provide a new and improved apparatus for precisely abrading the sidewalls of tires, in which the operating position of the grinding wheel is automatically controlled.

In accordance with a particular form of the invention, apparatus for precisely abrading the sidewalls of tires comprises a lower rim for engaging one bead of a tire to support the tire thereon and means for conveying tires to and from the bead-engaging rim. The apparatus also includes means actuated by the tire along the conveying means for automatically positioning the tire over the lower bead-engaging rim. The apparatus also includes an upper rim disposed above the lower rim for engaging the other bead of the tire and means actuated by the positioned tire for raising the lower bead-engaging rim toward the upper rim to grip the tire therebetween. The apparatus also includes means for inflating the tire, means for rotating the tire and means for precisely abrading the sidewall of the tire.

Also in accordance with the invention, apparatus for precisely abrading the sidewalls of tires of various sizes comprises a lower rim for engaging one bead of a tire to support the tire thereon and means for conveying tires to and from the bead-engaging rim. The apparatus also includes means actuated by the tire along the conveying means for automatically positioning the tire over the lower bead-engaging rim, and an upper rim disposed above the lower rim for engaging the other bead of the tire. The apparatus also includes means actuated by the positioned tire for raising the lower bead-engaging rim toward the upper rim to grip the tire therebetween. The apparatus also includes means for rotating the tire, means for abrading the sidewall of the tire and means for inflating the tire. The apparatus also includes means for inflating the tire and means responsive to the size of the tire when inflated for positioning the tire to provide a desired cooperative relation between the sidewall and the abrading means.

For a better understanding of the present invention, together with other and further objects thereof, reference is had to the following description taken in connection with the accompanying drawings, and its scope will be pointed out in the appended claims.

Referring to the drawings.

Figure 1:
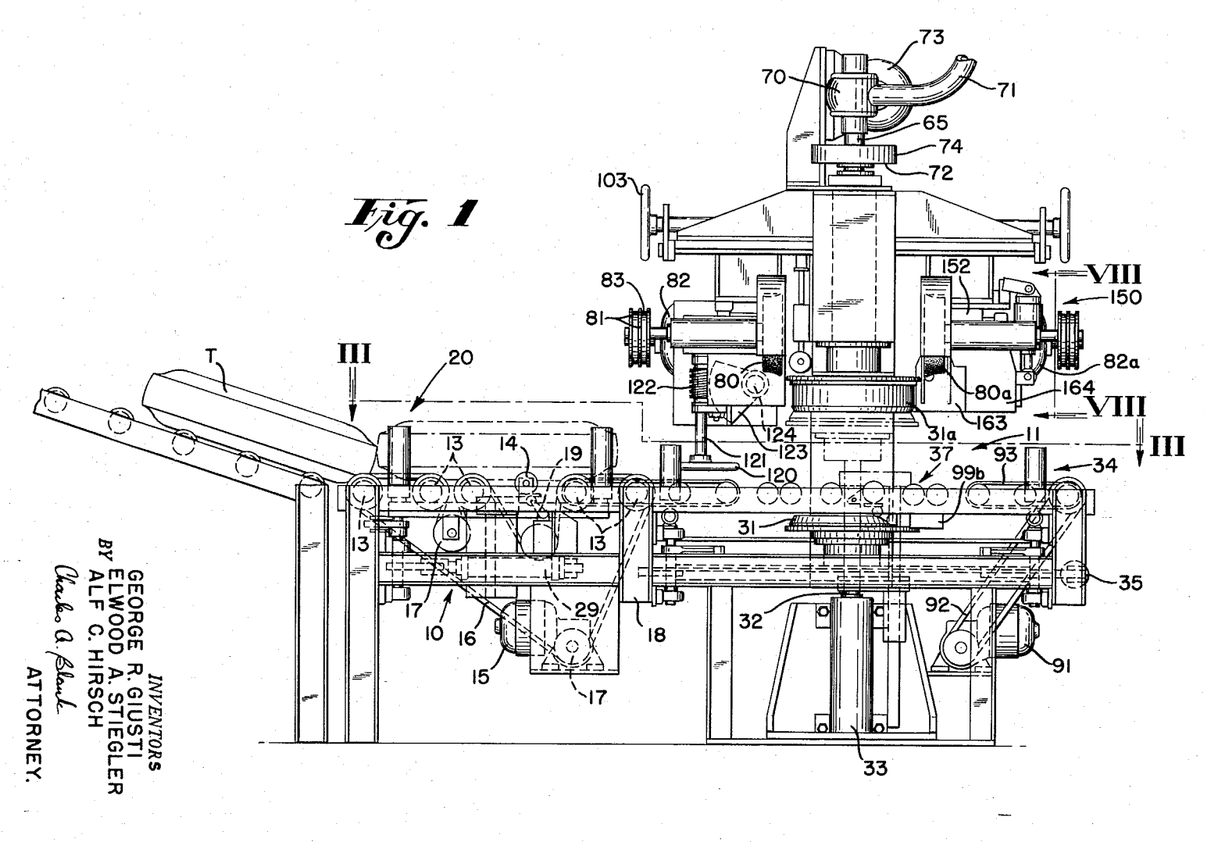
FIG. 1 is a front elevational view of apparatus constructed in accordance with the invention.

Referring now more particularly to FIG. 1 of the drawings, there is represented, in front elevational view, apparatus constructed in accordance with the invention for precisely abrading the sidewalls of tires. The FIG. 1 view of the apparatus is complete with the exception that certain electrical circuits and a solenoid control valve and piping system, more fully described hereinafter with reference to FIGS. 12 and 13, have been omitted from FIG. 1 for the sake of clarity. The FIG. 1 apparatus comprises an intake or feeder portion 10 and a tire-supporting or drum assembly 11.

The feeder portion 10 comprises a horizontal conveyor system having active rolls 13, 13 driven by a suitable motor 15 through a belt and pulley system 16, 17. A vertically displaceable idler roll 14 is provided for control purposes described hereinafter. A suitable frame 18 supports the motor and conveyor system. A limit switch 19 is mounted for actuation by idler roll 14. The feeder portion 10 of the FIG. 1 apparatus also includes means for accepting a single tire into the apparatus comprising a mechanism 20 controlled by limit switch 19.

The mechanism 20 may be more readily described with reference to FIG. 2, which is a side elevational view of the FIG. 1 apparatus, and with reference to FIG. 3, which is a view taken along line 3—3 of FIG. 1. The mechanism 20 comprises a pair of arms 21, 22 pivotally mounted at points 23, 24, respectively, and linked together by arms 25a, 25b and 25c having pivots at points 26, 27 and 28 and actuated by a pneumatic cylinder 29 through link arm 25d. The arms 21 and 22 have suitable rolls 30a, 30b, 30c, 30d at the ends thereof for engaging the tread of a conveyed tire. The mechanism 20 is represented in its position corresponding to the unactuated condition of cylinder 29.

There is also provided means for automatically positioning a tire over the lower bead-engaging rim. The means just mentioned comprises a mechanism 34 for automatically centering the tire for disposition on the lower rim 31. The mechanism 34 is actuated by a pneumatic cylinder 35 which is in turn controlled by means of a limit switch and a solenoid valve (not shown in FIGS. 1 or 3) as will be explained subsequently. A table of rolls 37, 37 is disposed to accept a tire from the conveyor rolls 13, 13. A belt drives a pair of rolls 37, 37 for conveying the tire.

The centering mechanism 34 comprises four arms 40, 41, 42, 43 pivotally mounted on pins 44, 45, 46, 47, respectively, attached to the supporting frame 18. Gears 49, 50, 51, 52 are attached to the arms 40, 41, 42, 43, respectively, for displacing the arms in response to actuation by cylinder 35 which is connected to arms 41 and 43 by means of links 48a, 48b, 48c, 48d. Suitable rollers 53a, 53b, 53c, 53d are mounted on arms 40, 41, 42, 43, respectively, for engagement with the tread of the tire. The centering mechanism is represented in solid-line construction in its condition corresponding to the unactuated condition of cylinder 35 and in broken-line construction in its condition corresponding to the actuated condition of cylinder 35.

The apparatus also includes a section of rolls 90, 90 for unloading tires after grinding. The rolls 90, 90 are driven by motor 91 through belts 92, 93. Referring again to FIG. 1, the abrading apparatus comprises means for engaging one bead of a tire to support the tire thereon. More particularly, this means comprises a lower drum assembly or rim 31. The apparatus also includes means for engaging the other bead of the tire comprising an upper drum assembly or rim 31a disposed above the lower rim. The apparatus also includes means for displacing one of the bead engaging means, namely the lower rim 31, toward the other to grip the tire therebetween. More particularly, this means comprises a suitable shaft 32 actuated by a cylinder 33.

Figure 2:
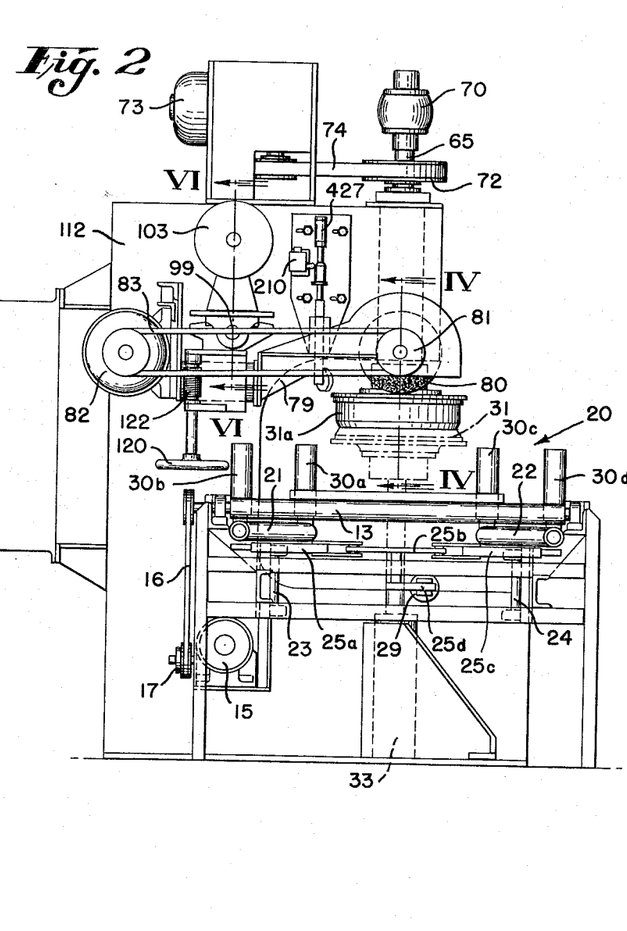
FIG. 2 is a side elevational view of the FIG. 1 apparatus.
Figure 3:
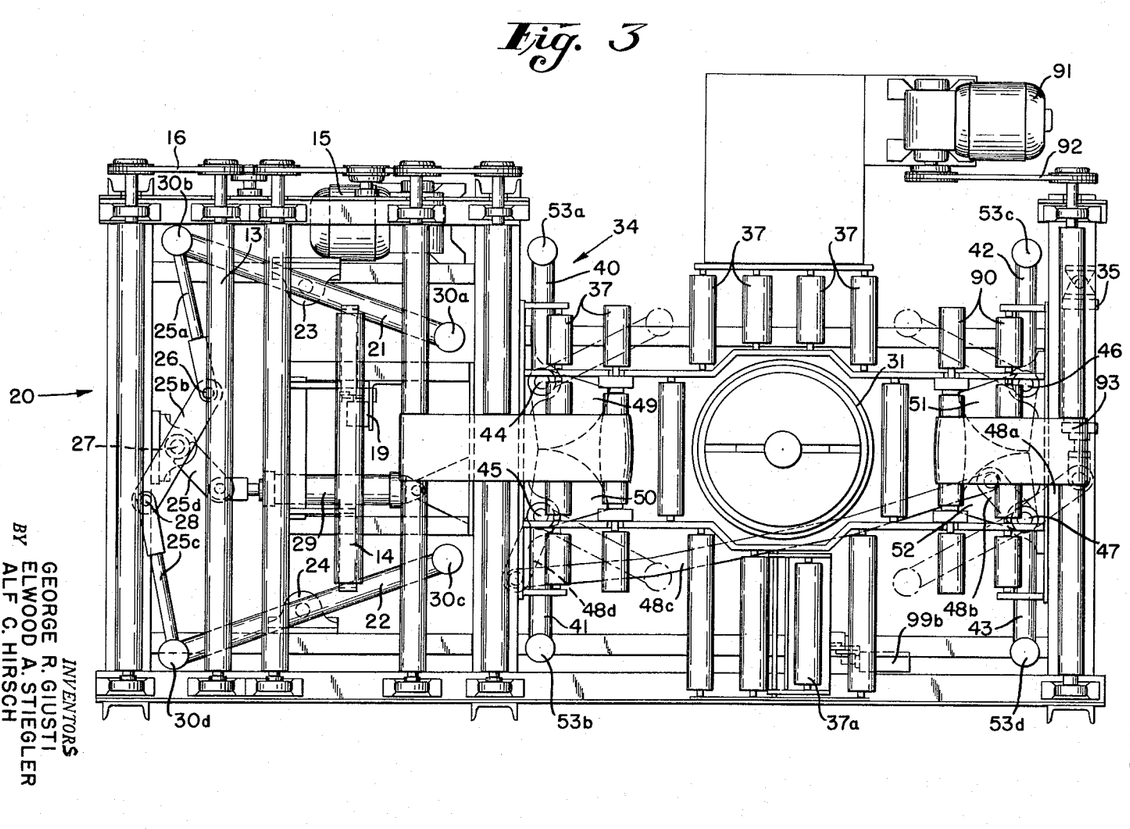
FIG. 3 is a plan view of the FIG. 1 apparatus taken along line 3—3 of FIG. 1.
Figure 4:
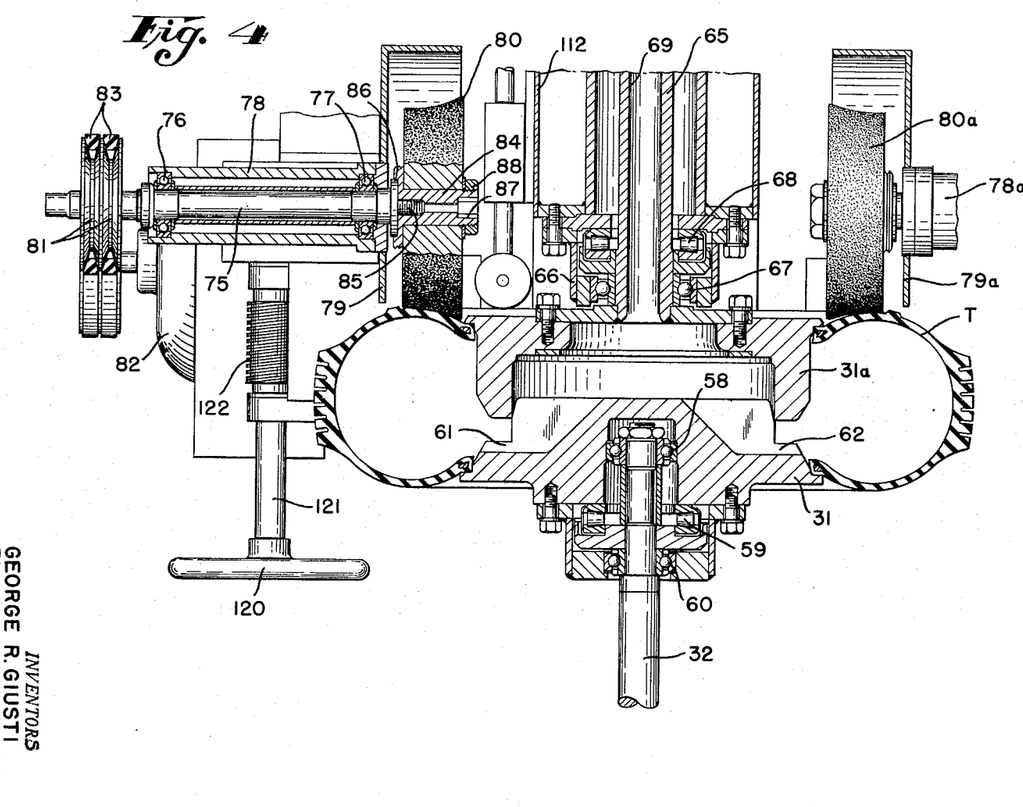
FIG. 4 is a view, in section, taken along line 4—4 of FIG. 2 representing the assembly supporting an inflated tire.
Figure 5:
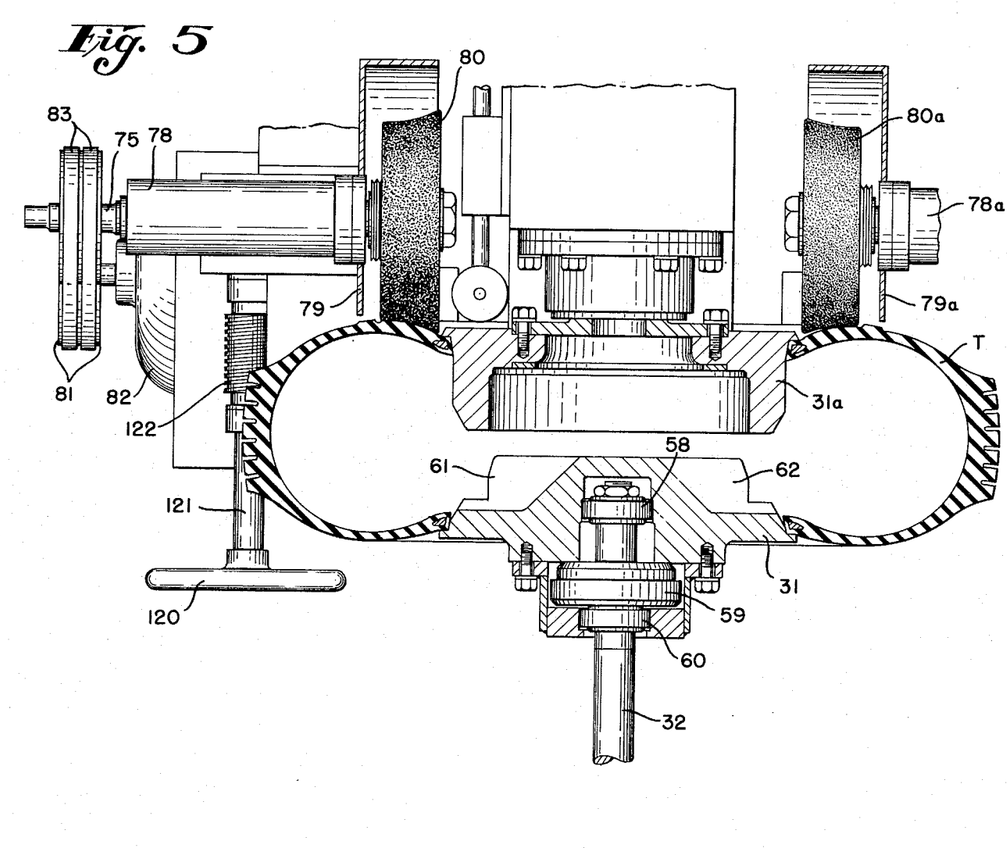
FIG. 5 is a view similar to FIG. 4, showing the device processing a larger size tire.

Referring now more particularly to FIGS. 4 and 5 of the drawings, the drum assembly is represented in a sectional view taken along line 4—4 of FIG. 2, supporting an inflated tire of one size in FIG. 4 and a larger size in FIG. 5. The lower and upper rims 31, 31a of the drum assembly are represented in a partially disengaged condition suitable for maintaining the tire T mounted thereon in a desired operative relation to the grinding wheels. The lower portion 31 of the drum assembly is journaled on the shaft 32 of the cylinder 33 by means of bearings 58, 59 and 60 suitably mounted to provide full rotation of the bead-engaging rim 31 and its connecting parts. The bead-engaging rim 31 also has air passages 61 and 62 for inflating the tire T. The upper rim 32 is connected to a hollow shaft 65 rotatably mounted in a housing 66 on bearings 67, 68. The shaft 65 has an air passage 69 for inflating the tire T.

Referring for the moment to FIG. 1, at the upper end of the shaft 65 there is keyed a pulley 72 which is driven by a motor 73 and belt 74. The upper extremity of the shaft 65 has a swivel connector 70 for air line 71.

Referring again to FIGS. 4 and 5 the grinding wheels or stones are similarly mounted on bracket plates 79, 79a. The rough grinding wheel 80 is mounted on a shaft 75 suitably journaled in bearings 76 and 77 within a housing 78 which is attached to bracket plate 79. On the inner end of the shaft 75, the grinding wheel 80 is mounted while on the outer end of the shaft 75 are pulleys 81 driven by a motor 82 and belts 83. The wheel 80 is mounted on a separate arbor 84 having an internal threaded portion 85 for connection to the shaft 75. The arbor 84 has a recessed portion 86 which fits over the shaft 75 to serve as a pilot. The opposite end of arbor 84 is equipped with a hexagon recess 87 for tightening the arbor to the shaft 75 and an external thread and nut 88 for holding the wheel 80 on the arbor 84.

Figures 6, 7:
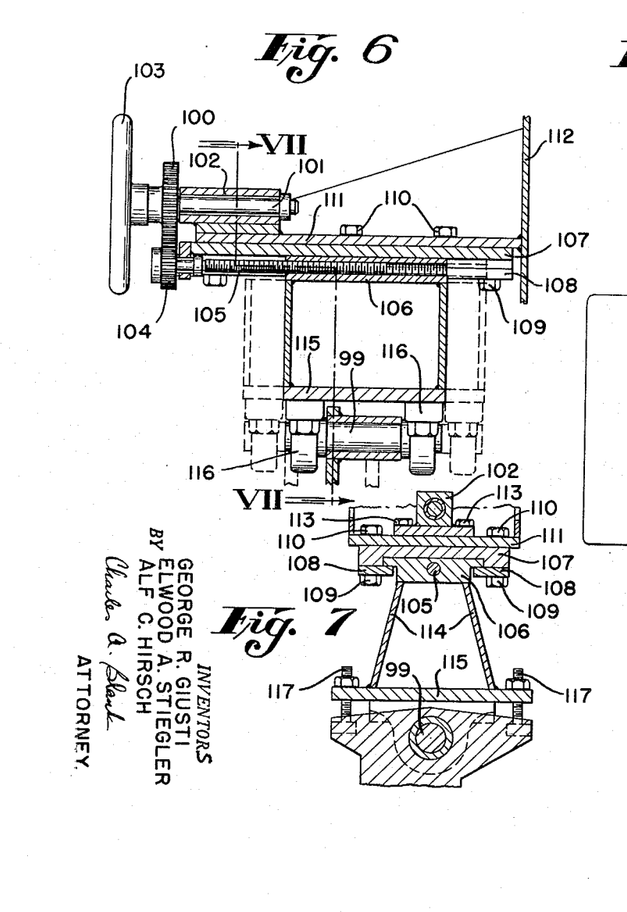
FIG. 6 is an enlarged view, in section, taken on line 6—6 of FIG. 2 to represent a device for adjusting the position of the rough grinding wheel.
FIG. 7 is a view, in section, taken along line 7—7 of FIG. 6.

Referring now to FIG. 6, which is a sectional view of the portion of the FIG. 2 apparatus taken along lines 6—6 of FIG. 2, and to FIG. 7, which is a sectional view taken along line 7—7 of FIG. 6, there is represented apparatus for manually adjusting the rough grinding wheel diametrically of the tire. A hand wheel 103 is provided to effect this adjustment and there is attached thereto a gear 100 keyed to a shaft 101 contained in a housing 102 and engaged with gear 104 attached to a threaded shaft 105. The shaft 105 screws into a block 106, causing the block to move within a plate 107 and side retaining plates 108 which are attached to the plate 107 by means of screws 109. The plate 107 is attached by means of screws 110 to an extension 111 of a side plate 112 of the apparatus. The housing 102 is also attached to the extension 111 by means of screws 113. Plates 114 are welded to and suspended from block 106 and are also welded to a base plate 115. There are attached to the bottom of plate 115, pillow blocks 116 in which shaft 99 and its cooperating parts are mounted for rotation when grinding wheel vertical position adjustments are effected by means of studs 117.

Referring again to FIGS. 1, 2, 4, and 5, a hand wheel 120 is provided to rotate shaft 121 and worm gear 122 which engages a gear segment 123 to position a shaft 124 in accordance with adjustment of the hand wheel 120. Rotation of the shaft 124 tilts the mounting bracket 79 to provide an angular adjustment of the rough grinding wheel 80.

Figure 8:
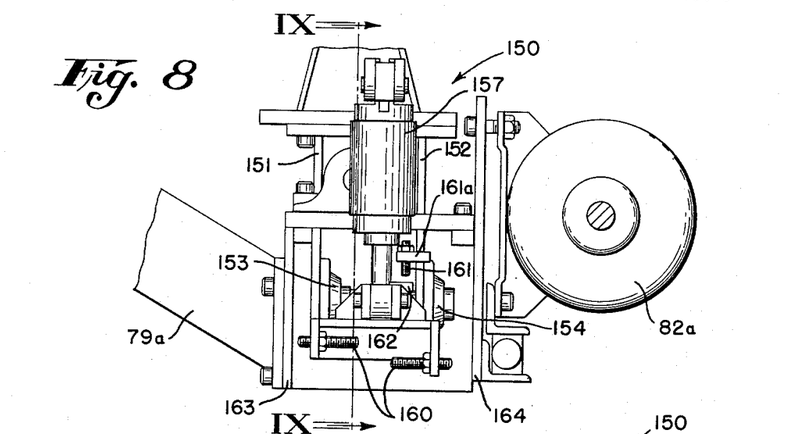
FIG. 8 is an enlarged view, partly in section, of a portion of the FIG. 1 apparatus taken along line 8—8 of FIG. 1.
Figures 9, 10:
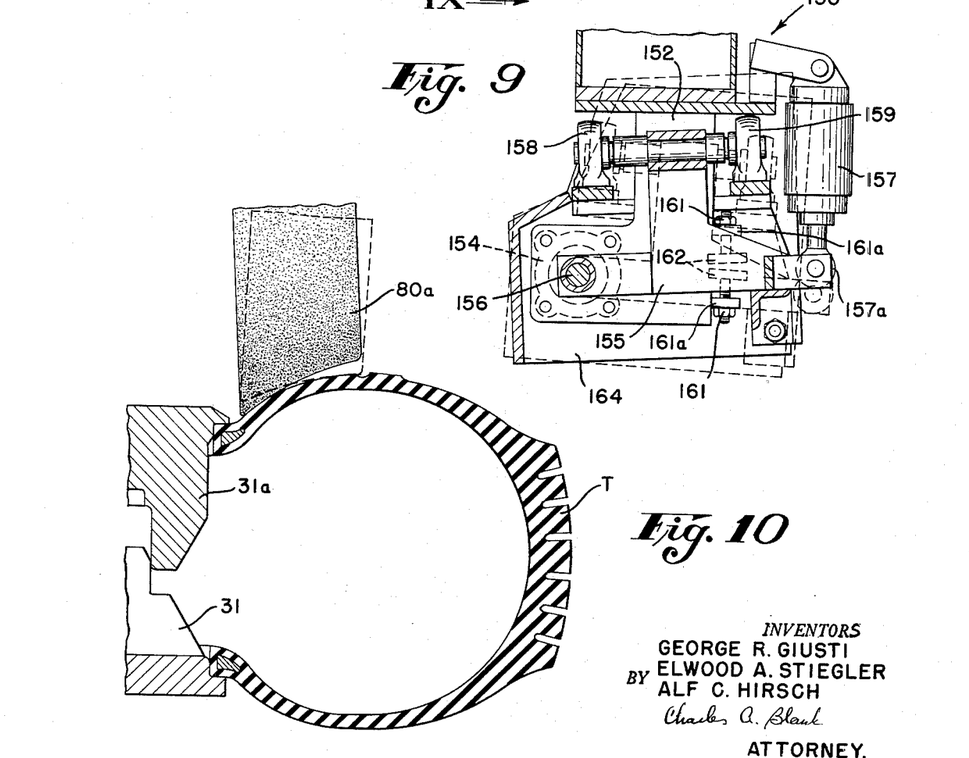
FIG. 9 is a view, in section, taken along line 9—9 of FIG. 8.
FIG. 10 is an enlarged fragmentary view, in section, of the finish grinding wheel in two operative relations to a tire.

Referring now more particularly to FIGS. 8 and 9, the apparatus includes means for automatically positioning the abrading means during the abrading operation to provide precise abrasion over the sidewall. More particularly, this means comprises a positioning mechanism 150 for rocking the finish grinding wheel 80a (not shown in FIG. 8 but mounted on bracket 79a) from the inner to outer diameters of the white portion of the tire during the abrading operation. The positioning mechanism 150 is represented in FIG. 9 in its initial position in solid-line construction and in its final position in broken-line construction. The positioning mechanism 150 is suspended from the frame by a pair of L-shaped plates 151 and 152 on which are bearings 153 and 154. A T-shaped plate 155 is mounted at one end on shaft 156 between bearings 153 and 154. Another end of the T-shaped plate 155 is connected to rod eye 157a of a cylinder 157. The third end of the plate 155 is mounted between bearings 158 and 159 for rocking the grinding wheel by moving side plate 163 and bracket 79a attached thereto. Adjustable studs 160 limit sidewise motions in the mechanism 150 by acting against side plates 163, 164 of that mechanism. Adjustable studs 161 mounted in pads 161a limit the rocking action of the mechanism by acting against stop 162 on plate 155.

Considering now the operation of the FIG. 1 apparatus, reference will be made initially to FIG. 11 which is a sequence diagram representing the operation of the apparatus, to FIG. 12 which is a diagram of the pneumatic system of the apparatus, and to FIG. 13 which is a diagram of the electrical control system. Various relays of FIG. 13 and their corresponding contacts are related in the diagram by corresponding reference numerals and by broken lines between the relay windings and the contacts. The limit switches and relay contacts of FIG. 13 are represented in their unactuated condition. As represented in FIG. 13, suitable alternating-current power is supplied through a transformer 200 to lines 201 and 202. When start button 203 is depressed, relay 204 is energized through limit switch contacts 19a which are closed due to the presence of a tire in the feed gate mechanism. When relay 204 is energized, contacts 204a, 204d and 204e close and contacts 204b and 204c open. When the start button 203 is depressed, contacts 203a perform an interlocking function to prevent simultaneous energization of solenoids 301 and 306 in the event that button 220a should also be depressed at this time in the cycle. Also at this time motor control relay 500 is energized, closing contacts 500a, 500b, 500c. The unloading motor 91 then is energized to operate conveyor rolls 93, to unload the previous tire from the apparatus to a suitable conveyor (not shown). At the same time solenoid 301 is energized to shift valve 401 from the position represented in FIG. 12 to its alternative position, thereby actuating cylinder 29 and opening the gate arms 21 and 22 to allow the tire to pass from the feeder conveyor rolls 13 to the table rolls 37.

The feeder conveyor rolls 13 are driven by motor 15 when relay 501 is energized. When the tire moves off the feeder conveyor rolls 13, limit switch 19 assumes its unactuated condition, opening contacts 19a and closing contacts 19b. When limit switch contacts 19b close, relay 205 is energized through limit switch contacts 19b, limit switch contacts 99a, and relay contacts 204a and 215a and stop button 208. When relay 205 is energized, relay contacts 205a, 205b, and 205d open, and 205c, 205e, and 205f close. Solenoid 303 of the valve 403 is energized through closed contacts 205e, 205f, 204a and 215a. When solenoid 303 is energized, valve 403 shifts from the position represented in FIG. 12 to its alternate position, actuating cylinder 35 to close the centering rolls 53a, 53b, 53c, 53d on the tire. When the tire is transferred to the table rolls 37 and is positioned between the centering rolls, limit switch 99a, 99b is actuated by roll 37a which opens contacts 99a and closes contacts 99b. Contacts 205e serve as holding contacts to maintain relay 205 energized.

Limit switch contacts 99b, when closed, are effective to cause energization of solenoid 304 through contacts 204d, 205c, 206a, and stop button 208. Valve 404 then shifts to the position represented in FIG. 12 to actuate cylinder 33 and raise the lower rim to engage the tire. This is accomplished by admitting air to the top of oil tank 511 and releasing air from the top of oil tank 512 and cylinder 427. Valve 513 is closed and valve 514 is open, thereby admitting oil to the bottom of cylinder 33 to actuate the cylinder.

Figure 12:
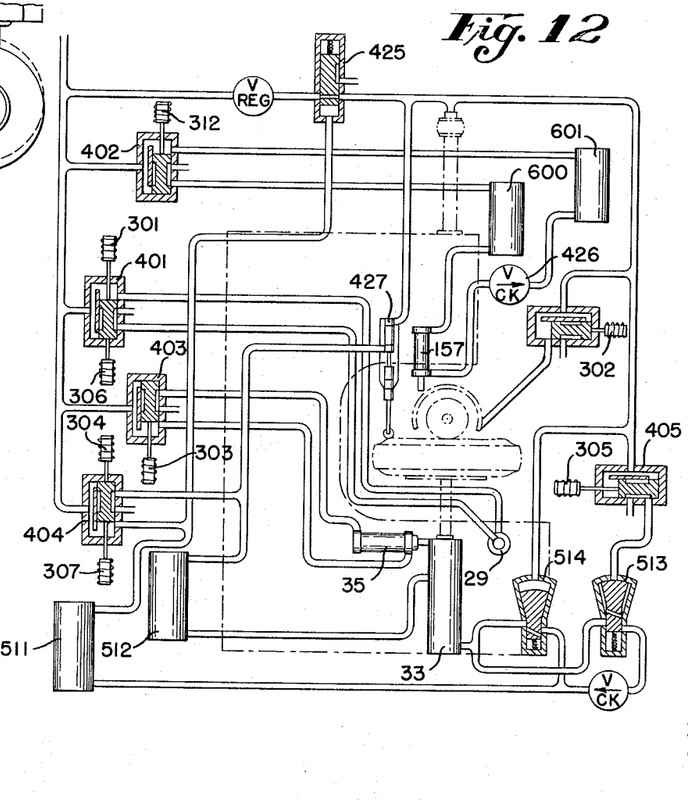
FIG. 12 is a diagram of the pneumatic system for controlling the operations of the FIG. 1 apparatus.
Figure 13:
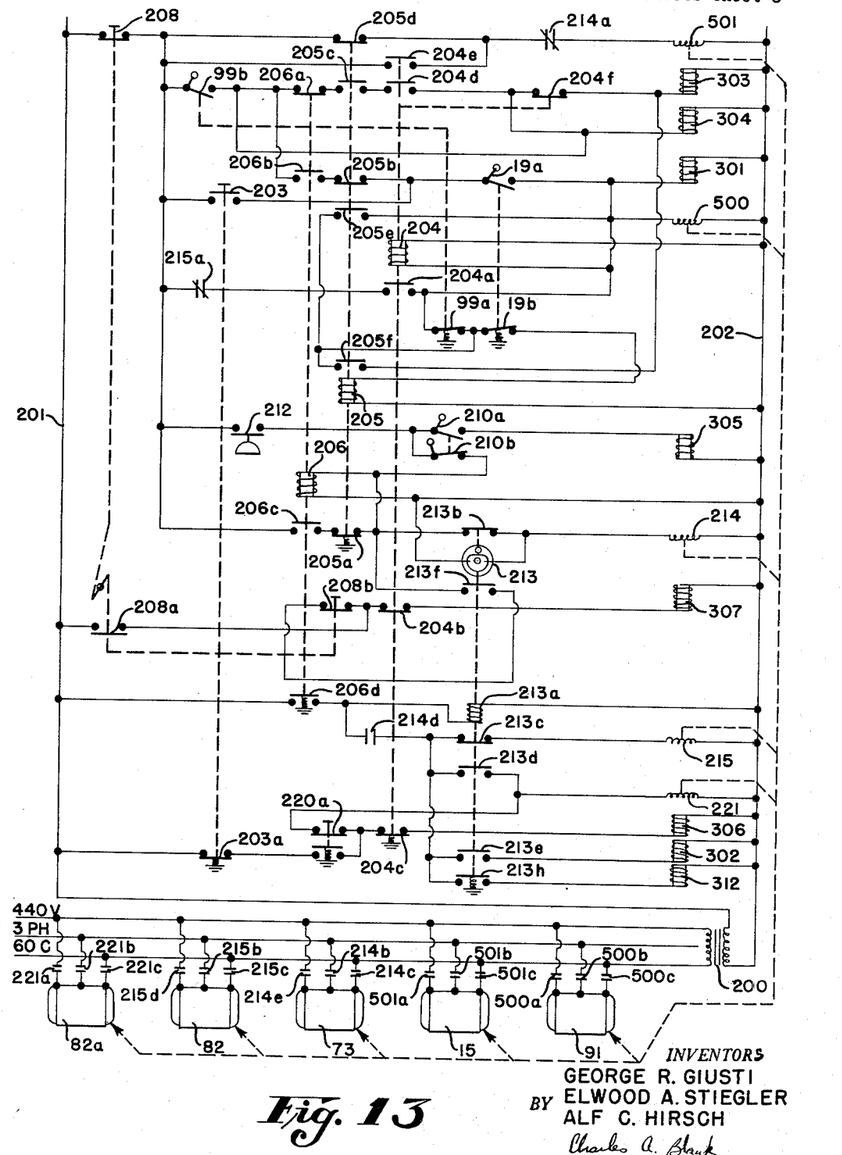
FIG. 13 is a circuit diagram, partly schematic, of the electrical control system for the FIG. 1 apparatus.

While the tire is rising to the position represented in FIG. 12, limit switch 99a, 99b is released and contacts 99a close and contacts 99b open. When contacts 99b open, solenoid 304 is deenergized. When the tire reaches its maximum limit represented in FIG. 12, the tire is inflated by means of air pressure through a pressure-reducing valve 425, connector 70 and shaft 65. The valve 425 is controlled through valve 404. Air pressure in the tire causes contacts of pressure switch 212 to close, indicating that the tire pressure has reached the prescribed limit for proper grinding. Also, air pressure through valve 425 pressurizes the diaphragm of valve 514 causing it to close, thereby blocking the oil pressure in cylinder 33. Simultaneously with the inflation of the tire, cylinder 427 is actuated at its upper end. As the wheel on the shaft of cylinder 427 is raised by the tire to the position represented in broken-line in FIG. 4a, a limit switch 210 (see FIG. 2) is actuated to energize solenoid 305 through contacts 210a and stop button 208. When solenoid 305 is energized, valve 405 shifts to its alternate position from the position represented in the drawing, applying air pressure to valve 513 to open valve 513, thereby bleeding oil from the bottom of cylinder 33 through an adjustable control valve. This reverse operation of the cylinder 33 separates the rims at a controlled speed and lowers the upper sidewall of the tire until the limit switch 210, actuated by the shaft of cylinder 427, is released. The release of the limit switch 210 opens contacts 210a and de-energizes solenoid 305, shifting valve 405 to the position represented in FIG. 12 and closing valve 513 which locks the cylinder 33 in position to hold the rims properly separated.

Figure 4A:
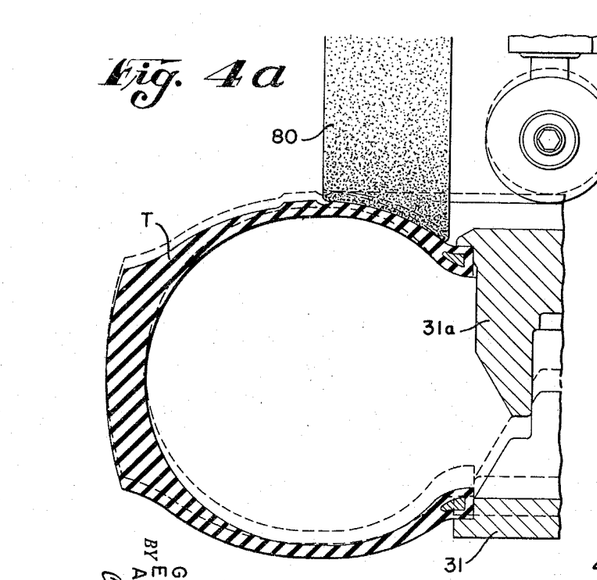
FIG. 4a is an enlarged fragmentary view, in section, of the FIG. 4 assembly.

Referring for the moment to FIG. 4a, the broken-line construction repesents the rims closed with the tire in its position of maximum height. The solid line construction of FIG. 4a shows the separated rims, the upper sidewall in its position of final adjustment and the contour regulator wheel engaging the rib on the sidewall. In this manner, a predetermined vertical dimension is maintained between the rib and the tire head held by the upper rim. This vertical dimension controls the relation between the sidewall and the grinding surface so that the white portion of the sidewall conforms to the contour of the grinding wheel.

When the limit switch 210 is released due to the reverse operation of cylinder 33, relay contacts 210b close, energizing relay 206 through contacts 212, 210b, and stop button 208. Relay contacts 206a then open and relay contacts 206b, 206c and 206d close.

The program timer for the machine is a commercially available Eagle Multiflex Timer having a motor 213 and a clutch actuated by energizing a solenoid 213a to engage a set of drive gears located on a column. The column is driven by the motor 213 when the gears are engaged to actuate a cam surface which opens and closes contacts 213b–213h inclusive. When limit switch 210 is released, timer motor 213 is started and relay 214 is energized to rotate the tire, due to current flow through contacts 213b, 210b, 212 and stop button 208. When relay 214 is energized, relay contacts 214a open, de-energizing relay 501 and temporarily stopping the loading conveyor motor 15 by opening contacts 501a, 501b, 501c.

When relay contacts 206d close, timer clutch solenoid 213a is energized, engaging the timer gears during the mechanical action initiated by the starting of motor 213. Simultaneously with the closing of 206d, through 214d and 213c, rough grind relay 215 is energized, thereby closing contacts 215b, 215c and 215d to start motor 82.

When relay 215 is energized, relay contacts 215a close, de-energizing relays 204 and 205 and solenoids 301 and 303. When solenoid 301 is de-energized, solenoid 306 is effective to shift the valve 401 to the position represented in FIG. 12, releasing air from cylinder 29 and thereby returning the feeder arms 21, 22 to the position represented in FIG. 2. The next tire then passes into the feed portion of the apparatus.

The control relay 500 for the unloading drive motor 91 and relay 205 are also de-energized when relay contacts 204a open. Solenoid 303 is de-energized when relay contacts 204d open and solenoid valve 403 then returns to the position represented in FIG. 12, opening the centering mechanism 40, 41, 42, 43 of FIG. 3.

When contacts 213e close, solenoid 302 is energized, actuating its corresponding valve of FIG. 12 to direct air jets at the two grinding stones to clean and cool the tire. At the end of a predetermined time delay determined by the cam surface of the timer, relay contacts 213c open, de-energizing relay 215 and causing the rough grind motor to stop. At the same time contacts 213d close and solenoid 306 is energized through relay contacts 204c, contacts 220a, contacts 213d, 214d and 206d. When solenoid 306 is energized, valve 401 shifts to the position represented in the drawing thereby releasing pressure from cylinder 29 and returning the feed gate arms 21 and 22 to the position represented in FIG. 3. When the gate arms 21, 22 return to the position represented in FIG. 3, the next tire enters the feed portion of the apparatus and actuates limits switch 19. Also, control relay 221 is then energized through contacts 213d, 214d and 206d, closing contacts 221a, 221b, 221c to start the finish grind motor 82. After the finish grind motor has started, and a preset timing period has elapsed, contacts 213h of the timer close, energizing solenoid 312 which shifts valve 402 from the position shown in FIG. 12, thereby applying pressure to the top of oil tank 600 which, in turn, applies hydraulic pressure to the top of cylinder 157. Simultaneously, air is removed from the top of oil tank 601 through valve 402. The speed of the forward stroke of cylinder 157 is controlled through an adjustable valve 426 so the rocking action of the wheel 80a is completed before motor 82a is de-energized through de-energization of relay 221. Contacts 213d of the timer de-energize relay 221 and solenoid 306 after a preset time interval determined by the cam surface of the timer.

Solenoid 307 is then energized, shifting valve 404 from the position represented in FIG. 12 to its alternate position and allowing the tire to be deflated and lowered. Tire deflation occurs when valve 404 exhausts the air from the lines connected to oil tank 511. Also, air is then exhausted from valve 425, which shifts from the position represented in the drawing to its alternate position. Air is then exhausted from valve 514, which shifts from the position represented in the drawing to its alternate position, deflating the tire and allowing oil to flow from the bottom of cylinder 33. At the same time air pressure is applied through valve 404 to oil tank 512, causing the application of hydraulic pressure to the top of cylinder 33 to lower the tire. When the tire has been completely lowered, it engages roller 37a actuating limit switch 99a, 99b.

When limit switch 99a, 99b is actuated, contacts 99a open and contacts 99b close. Relay 204 and solenoid 301 are then energized by current flow through contacts 19a, 205b, 206b, 99b and stop button 208. The energizing of relay 204 closes contacts 204a, 204d, 204e and opens contacts 204b and 204c. The opening of contacts 204b de-energizes solenoid 307. At the same time, solenoid 301 is energized to shift valve 401 from the position represented in FIG. 12 to its alternate position, thereby actuating cylinder 29 and opening the gate arms 21 and 22. Also, the closing of contacts 99b results in energization of relay 500 through contacts 19a, 205b, 206b, 99b and stop button 208. When relay 500 is energized, the unloading motor 91 operates conveyor rolls 93, preparing to unload the tire from the apparatus to a suitable conveyor not shown, thereby releasing limit switch 99a, 99b. At a suitable time, the timer causes relays 213 and 214 to be de-energized by opening normally closed contacts 213b, thereby stopping the timer motor and the tire rotating motor 73.

When relay 214 is de-energized, relay 501 is energized by current flow through relay contacts 214a, 205d and stop button 208. The feed motor 15 then operates to cause the next tire to pass from the feed conveyor rolls 13 to the table rolls 37.

When the tire moves off the feed conveyor roll 13, limit switch 19 assumes its unactuated condition, opening contacts 19a and closing contacts 19b resulting in the energization of relay 205 as previously described. The energizing of relay 205 opens contact 205a, de-energizing relay 206. When relay 206 is de-energized, contacts 206b, 206c and 206d open and contacts 206a close. Contacts 206a allow solenoid 304 to be energized for raising the tire. Contacts 206c open the maintaining circuit to relay 206. Contacts 206d de-energize timer clutch solenoid 213a. De-energizing solenoid 213a causes the cam surface which actuates all timer contacts to be automatically reset to its start position corresponding to time zero. Also, when the tire is transferred to the table rolls 37 and is positioned between the centering rolls, limit switch 99a, 99b is actuated as previously described.

Figure 11:
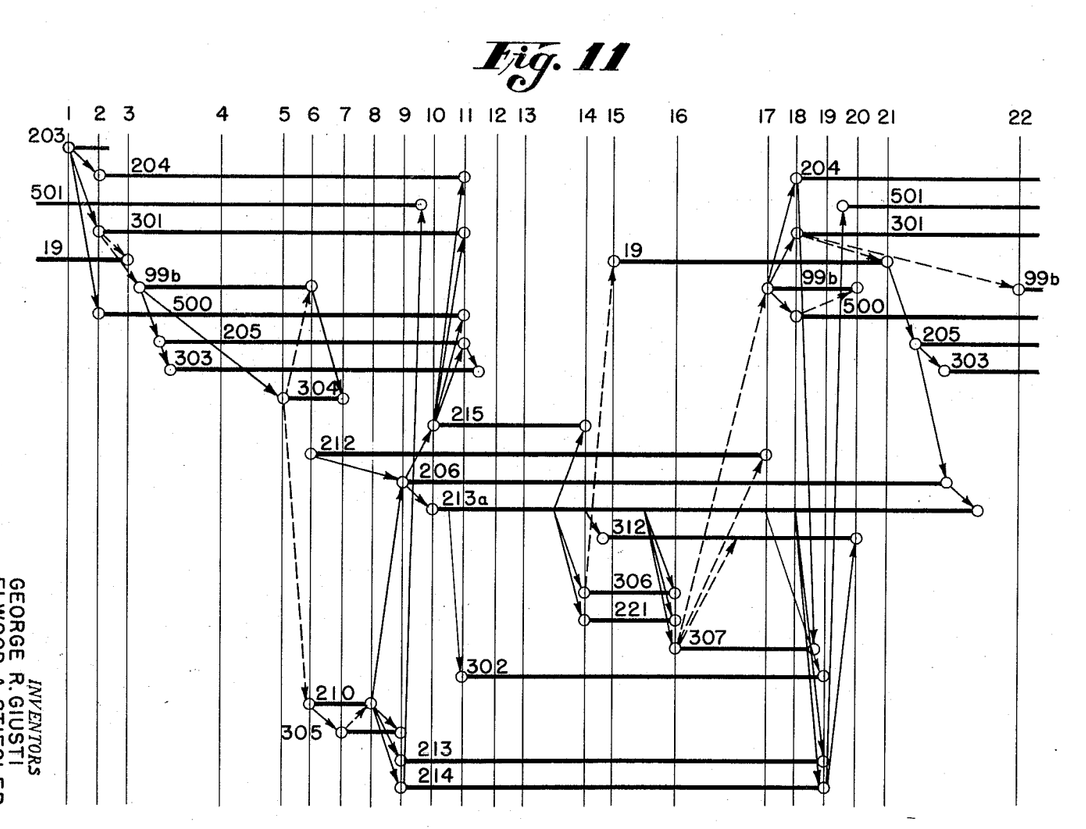
FIG. 11 is a sequence diagram to aid in explaining the operation of the FIG. 1 apparatus.

The operation of the apparatus is then the same as previously described continuing from step 4 of the sequence diagram of FIG. 11.

In the event that it is desired to stop the operation of the machine immediately, stop button 208 may be depressed opening contacts 208a and 208b. Solenoid 307 will then be energized, actuating valve 404 and allowing the tire to be lowered.

From the foregoing description it will be apparent that apparatus constructed in accordance with the invention for abrading the sidewalls of tires has several advantages. The apparatus is effective to abrade the sidewalls of tires in a wide range of sizes, automatically positioning the tire properly and automatically positioning the finish grind wheel.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim and desire to protect by Letters Patent is:

1. Apparatus for precisely abrading the sidewalls of tires comprising a lower rim for engaging one bead of a tire to support the tire thereon; means for conveying tires to and from said bead-engaging rim; means actuated by the tire along said conveying means for automatically positioning the tire over said lower bead-engaging rim; an upper rim disposed above said lower rim for engaging the other bead of the tire; means actuated by the positioned tire for raising said lower bead-engaging rim toward said upper rim to grip the tire therebetween; means for inflating the tire; means for rotating the tire and means for precisely abrading the sidewall of the tire.

2. Apparatus for precisely abrading the sidewalls of tires of various sizes comprising a lower rim for engaging one bead of a tire to support the tire thereon; means for conveying tires to and from said bead-engaging rim; means actuated by the tire along said conveying means for automatically positioning the tire over said lower bead-engaging rim; an upper rim disposed above said lower rim for engaging the other bead of the tire; means actuated by the positioned tire for raising said lower bead-engaging rim toward said upper rim to grip the tire therebetween; means for abrading the sidewall of the tire; means for rotating the tire; means for inflating the tire; and means responsive to the size of the tire when inflated for positioning the tire to provide a desired operative relation between the sidewall and said abrading means.

3. Apparatus for precisely abrading the sidewalls of tires of various sizes comprising adjustably positioned means for supporting a tire thereon; means for abrading the sidewall of the tire; means for inflating the tire; means for positioning said supporting means; and means contiguous with the sidewall of the tire when inflated for controlling said positioning means to provide a desired operative relation between the sidewall and said abrading means.

4. Apparatus for precisely abrading the sidewalls of tires of various sizes comprising adjustably positioned means for supporting a tire thereon; means for abrading the sidewall of the tire; means for inflating the tire; means for rotating the tire; means for positioning said supporting means; and means comprising a movable shaft actuated by the sidewall of the tire when inflated for energizing the positioning means when said shaft is actuated by the sidewall to control the positioning means to move the sidewall to provide a predetermined distance between the sidewall and the bead.

5. Apparatus for precisely abrading the sidewalls of tires of various sizes comprising a lower rim for engaging one bead of a tire horizontally to support the tire thereon; means for conveying tires to and from said bead-engaging rim; means actuated by the tire along said conveying means for automatically positioning the tire over said lower bead-engaging rim; an upper rim disposed above said lower rim for engaging the other bead of the tire; means actuated by the positioned tire for raising said lower bead-engaging rim toward said upper rim to grip the tire therebetween; means for abrading the sidewall of the tire; means for inflating the tire; means for rotating the tire; and means comprising a movable rod actuated by the sidewall of the tire when inflated for controlling said raising means to lower the lower bead engaging means to maintain a predetermined vertical distance between the tire sidewall and bead to conform the tire sidewall to the abrading means.

References Cited in the file of this patent

UNITED STATES PATENTS

| | | |
|---|---|---|
| 918,769 | Sachs | Apr. 20, 1909 |
| 1,614,076 | McGlenathen | Jan. 11, 1927 |
| 2,810,238 | Yoho et al. | Oct. 22, 1957 |
| 2,864,445 | Hawkinson | Dec. 16, 1958 |
| 2,893,172 | Schrank | July 7, 1959 |